United States Patent
Lee

(10) Patent No.: US 12,372,145 B1
(45) Date of Patent: Jul. 29, 2025

(54) LOCKING DIFFERENTIAL POSITION SENSOR

(71) Applicant: Schaeffler Technologies AG & Co. KG, Herzogenaurach (DE)

(72) Inventor: Brian Lee, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/805,195

(22) Filed: Aug. 14, 2024

(51) Int. Cl.
  *F16H 48/34* (2012.01)
  *F16H 48/08* (2006.01)

(52) U.S. Cl.
  CPC ............ *F16H 48/08* (2013.01); *F16H 48/34* (2013.01); *F16H 2048/343* (2013.01)

(58) Field of Classification Search
  CPC ..... F16H 48/08; F16H 48/34; F16H 2048/343
  See application file for complete search history.

(56) References Cited

U.S. PATENT DOCUMENTS

| | | | |
|---|---|---|---|
| 9,644,690 | B2 | 5/2017 | Lee |
| 10,378,613 | B1 | 8/2019 | Lee et al. |
| 11,441,656 | B2 | 9/2022 | Loeffelmann et al. |
| 2005/0070393 | A1 | 3/2005 | DeGowske et al. |
| 2008/0042791 | A1* | 2/2008 | York ..................... F16H 48/24 335/296 |
| 2015/0133254 | A1* | 5/2015 | Fox ..................... F16H 48/22 475/150 |
| 2015/0204431 | A1 | 7/2015 | Cochren et al. |
| 2018/0038422 | A1* | 2/2018 | Yoshisaka ............... F16D 11/14 |
| 2019/0226566 | A1 | 7/2019 | Hillman et al. |
| 2019/0383378 | A1* | 12/2019 | Surve ..................... F16H 48/34 |
| 2020/0094676 | A1* | 3/2020 | Creech .................. B60K 23/04 |
| 2020/0292356 | A1* | 9/2020 | McGraner ............... F16H 48/24 |
| 2021/0301884 | A1* | 9/2021 | Hennessy ............. F16D 35/024 |
| 2023/0026552 | A1* | 1/2023 | Bangar ..................... H01F 7/16 |
| 2023/0406097 | A1* | 12/2023 | Yang ..................... B60K 23/08 |
| 2024/0125377 | A1 | 4/2024 | Lee et al. |

FOREIGN PATENT DOCUMENTS

| | | | | |
|---|---|---|---|---|
| DE | 202015007761 | U1 * | 1/2016 | ............. F16D 11/08 |
| DE | 102015200667 | A1 * | 7/2016 | ............. F16H 48/38 |
| WO | 2023041199 | A1 | 3/2023 | |

* cited by examiner

*Primary Examiner* — Tisha D Lewis
(74) *Attorney, Agent, or Firm* — Suiter Swantz IP

(57) ABSTRACT

A locking differential may be an electric locking differential with a bushing and an annular position sensor which are affixed. The bushing and the annular position sensor may axially translate relative to an actuation side housing of the electric locking differential. A target ring may be affixed to the actuation side housing. The target ring may be at a fixed axial position relative to a locking side gear. The annular position sensor may be at a fixed axial position relative to a clutch plate. The annular position sensor may determine a relative axial position between the annular position sensor and the target ring. The relative axial position may indicate a relative axial position between the clutch plate and the locking side gear, thereby indicating whether the electric locking differential is locked or unlocked.

20 Claims, 11 Drawing Sheets

LOCKING DIFFERENTIAL POSITION SENSOR

TECHNICAL FIELD

The present disclosure generally relates to differentials, and more particularly, to locking differentials.

BACKGROUND

Differential gearings may include bevel gears having orbital motion. The bevel gears may mesh with side gears. The side gears may be unlocked to provide differential rotation or locked together to prevent the differential rotation. Difficulties may arise when providing a sensing means for detecting whether the side gears are locked or unlocked. Therefore, it would be advantageous to provide a device, system, and method that cures the shortcomings described above.

SUMMARY

An electric locking differential is described, in accordance with one or more embodiments of the present disclosure. The electric locking differential may include: a final drive gear, wherein the final drive gear includes an external helical gear and a flange, wherein the flange is disposed radially inwards of and axially aligned with the external helical gear; an actuation side housing, wherein the actuation side housing is affixed to the flange, wherein the final drive gear and the actuation side housing are configured to rotate together about a center axis; a target ring, wherein the target ring is affixed to the actuation side housing; a bushing, wherein the bushing and the actuation side housing are coupled by a cylindrical joint; and an annular position sensor, wherein the bushing and the annular position sensor are affixed, wherein the annular position sensor is configured to detect a relative axial position between the annular position sensor and the target ring, wherein the relative axial position between the annular position sensor and the target ring indicates the electric locking differential is configured in an unlocked configuration or a locked configuration.

In some aspects, the annular position sensor includes one or more inductive position sensors.

In some aspects, the bushing includes an axial portion and a radial portion, wherein the radial portion extends radially outwards from the axial portion, wherein the axial portion forms the cylindrical joint with the actuation side housing, wherein the annular position sensor is axially aligned with and disposed radially outwards of the axial portion of the bushing, wherein the annular position sensor is radially aligned with the radial portion of the bushing.

In some aspects, the electric locking differential includes an electromagnet, wherein the actuation side housing is made of a ferrous material, wherein the electromagnet configures the electric locking differential from the unlocked configuration to the locked configuration when the electromagnet is engaged, wherein the bushing, the electromagnet, and the annular position sensor are affixed, wherein the electromagnet, the bushing, and the annular position sensor do not rotate together with the final drive gear and the actuation side housing.

In some aspects, the electromagnet is disposed radially outwards of, axially aligned with, and affixed to the bushing.

In some aspects, the electric locking differential includes a bearing coupled to the actuation side housing, wherein the bearing is coupled to the actuation side housing, wherein the bearing is radially aligned with the bushing, wherein the target ring is axially disposed between the bearing and the annular position sensor.

In some aspects, the electric locking differential includes a locking side gear, wherein an axial position of the target ring to the locking side gear is fixed; and a clutch plate, wherein the clutch plate and the locking side gear form a dog clutch in the locked configuration, wherein an axial position of the clutch plate relative to the annular position sensor is fixed.

In some aspects, the electric locking differential includes a bevel gearset, wherein the bevel gearset includes a plurality of bevel gears, wherein the plurality of bevel gears are affixed to the flange, wherein the final drive gear and the bevel gearset are configured to rotate together about the center axis, wherein the plurality of bevel gears are orthogonal to and rotate about the center axis via orbital motion; and a side gear, wherein the side gear and the locking side gear are coupled to the plurality of bevel gears, wherein the bevel gearset is disposed axially between the side gear and the locking side gear, wherein the side gear and the locking side gear rotate independently in the unlocked configuration, wherein the side gear and the locking side gear rotate together in the locked configuration.

In some aspects, the flange defines a plurality of recessed portions, wherein the bevel gearset includes a plurality of pins, wherein the plurality of pins and the plurality of bevel gears are affixed together, wherein the plurality of pins are disposed within and abut the plurality of recessed portions, wherein the plurality of pins and the plurality of bevel gears are orthogonal to and rotate about the center axis via orbital motion.

In some aspects, the electric locking differential includes a return spring, wherein the return spring is configured to return the clutch plate from the locked configuration to the unlocked configuration.

In some aspects, the locking side gear, the return spring, and the clutch plate are radially disposed within and axially aligned with the actuation side housing.

In some aspects, the electric locking differential includes a thrust bearing and a plurality of actuation pins, wherein the plurality of actuation pins rotate together with the actuation side housing, wherein the plurality of actuation pins are axially disposed between, radially aligned with, and couple the thrust bearing and the clutch plate, wherein the thrust bearing is axially disposed between, radially aligned with, and couples the bushing and the plurality of actuation pins.

In some aspects, the thrust bearing couples to a radial portion of the bushing.

In some aspects, the thrust bearing couples axial translation between the bushing and the plurality of actuation pins without coupling rotation of the final drive gear through the actuation side housing and the plurality of actuation pins to the bushing.

In some aspects, the plurality of actuation pins are configured to translate through a radial portion of the actuation side housing.

In some aspects, the electric locking differential includes an inner housing, wherein the inner housing is affixed between the flange and the actuation side housing, wherein the clutch plate and the inner housing are coupled by a spline.

In some aspects, the electric locking differential includes a retaining ring, wherein the return spring is axially disposed between, radially aligned with, and couples the retaining ring and the clutch plate, wherein the retaining ring is affixed to the inner housing.

In some aspects, the flange, the inner housing, and the actuation side housing are affixed by a plurality of fasteners or a weld.

A powertrain is described, in accordance with one or more embodiments of the present disclosure. The powertrain may include: an electric locking differential including: a final drive gear, wherein the final drive gear includes an external helical gear and a flange, wherein the flange is disposed radially inwards of and axially aligned with the external helical gear; an actuation side housing, wherein the actuation side housing is affixed to the flange, wherein the final drive gear and the actuation side housing are configured to rotate together about a center axis; a target ring, wherein the target ring is affixed to the actuation side housing; a bushing, wherein the bushing and the actuation side housing are coupled by a cylindrical joint; and an annular position sensor, wherein the bushing and the annular position sensor are affixed, wherein the annular position sensor is configured to detect a relative axial position between the annular position sensor and the target ring, wherein the relative axial position between the annular position sensor and the target ring indicates the electric locking differential is configured in an unlocked configuration or a locked configuration; a motor; and a transmission, wherein the transmission couples torque from the motor to the final drive gear.

In some aspects, the powertrain includes a pair of axles, wherein the electric locking differential includes a side gear and a locking side gear, wherein the pair of axles are coupled to an internal spline of the side gear and the locking side gear; and a pair of driven wheels coupled to the pair of axles, wherein the side gear, the locking side gear, the pair of axles and the pair of driven wheels are configured to rotate about the center axis.

BRIEF DESCRIPTION OF THE DRAWINGS

The numerous advantages of the disclosure may be better understood by those skilled in the art by reference to the accompanying figures in which:

FIG. 1I depicts an exploded view of the electric locking differential, in accordance with one or more embodiments of the present disclosure.

DETAILED DESCRIPTION

Figure 1A:
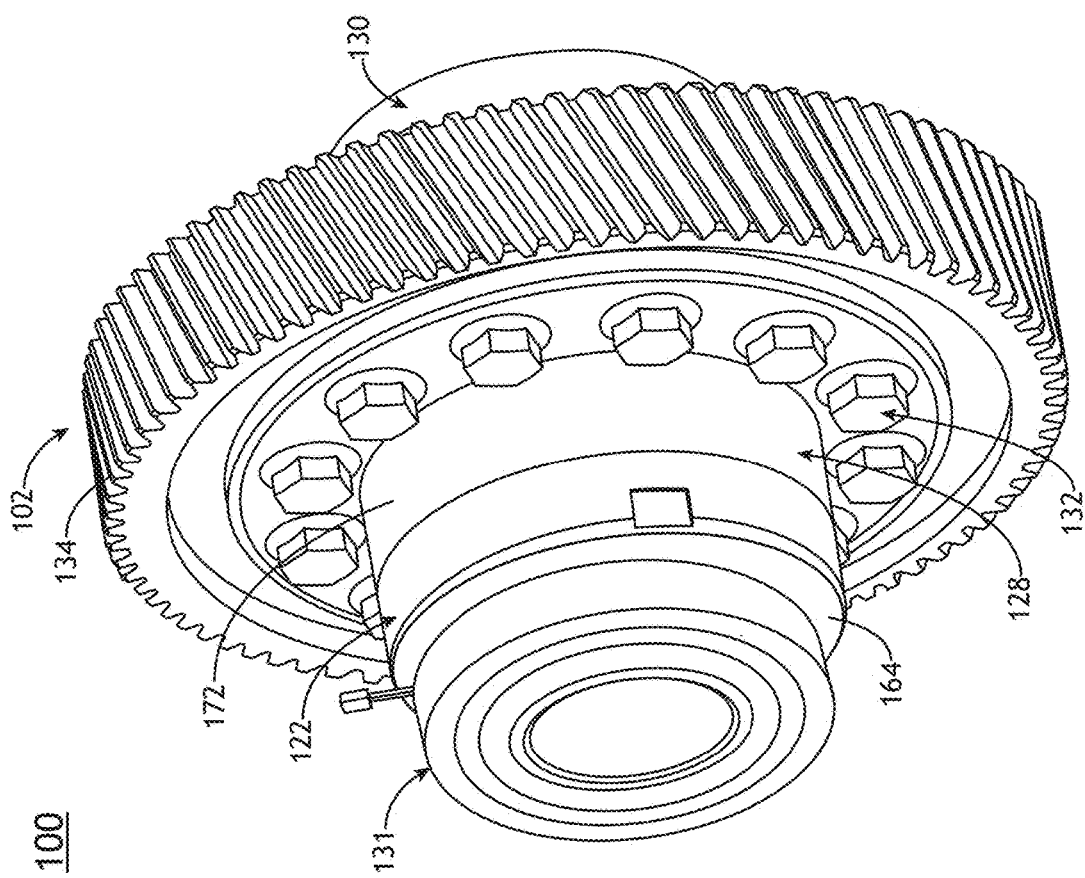
FIG. 1A depicts a perspective view of an electric locking differential, in accordance with one or more embodiments of the present disclosure.
Figure 1B:
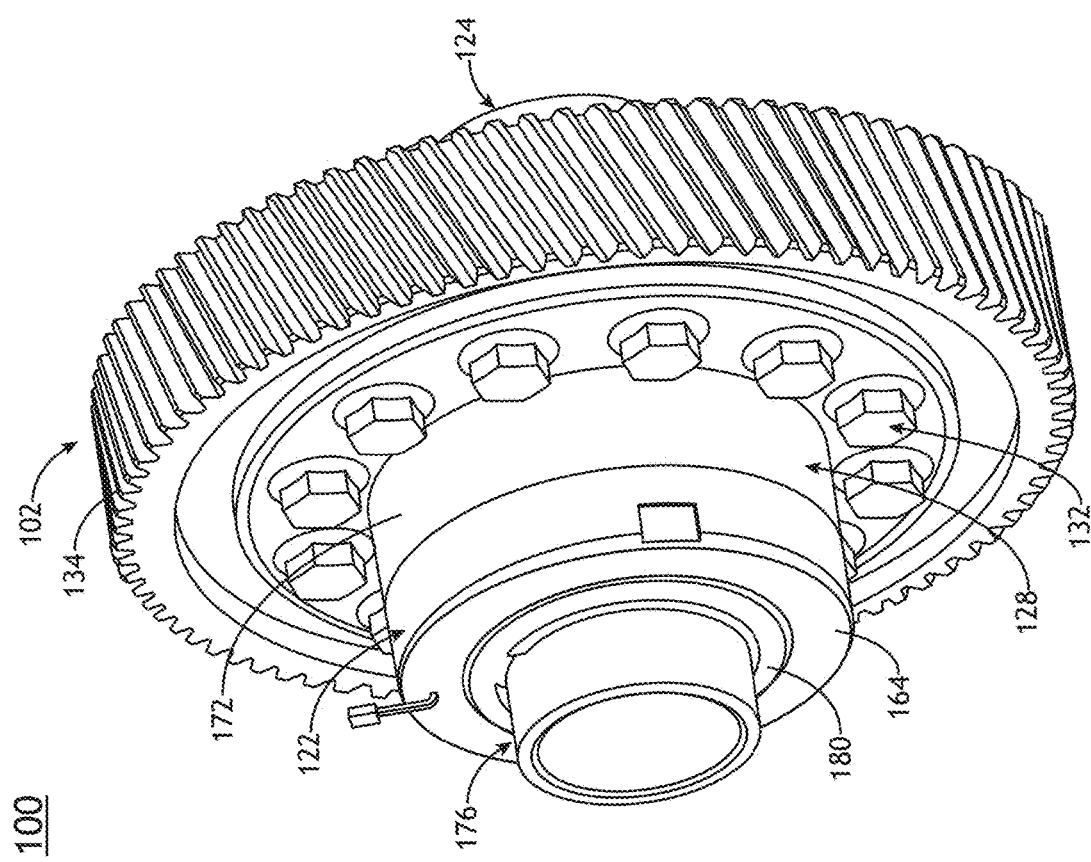
FIG. 1B depicts the perspective view of the electric locking differential with bearings which are hidden, in accordance with one or more embodiments of the present disclosure.
Figure 1C:
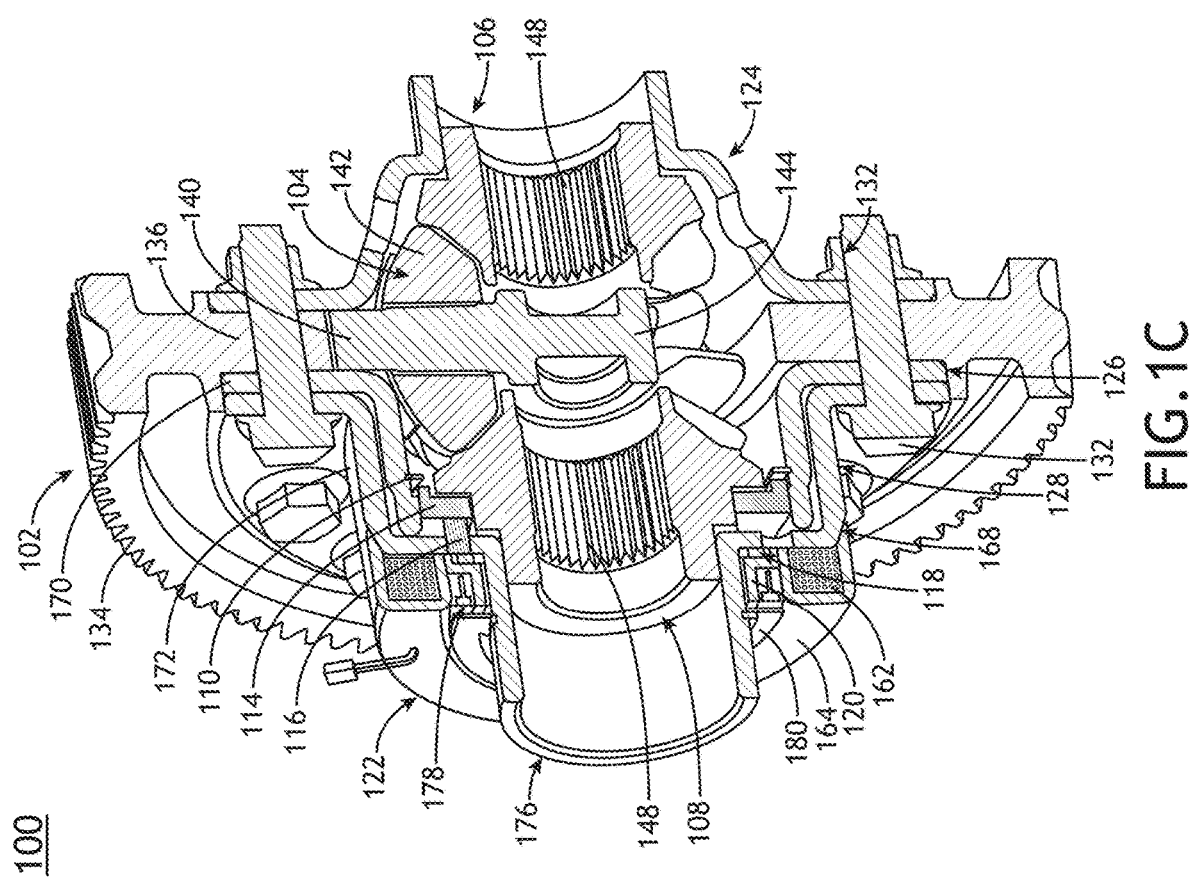
FIG. 1C depicts a cross-section view of the electric locking differential, in accordance with one or more embodiments of the present disclosure.
Figure 1D:
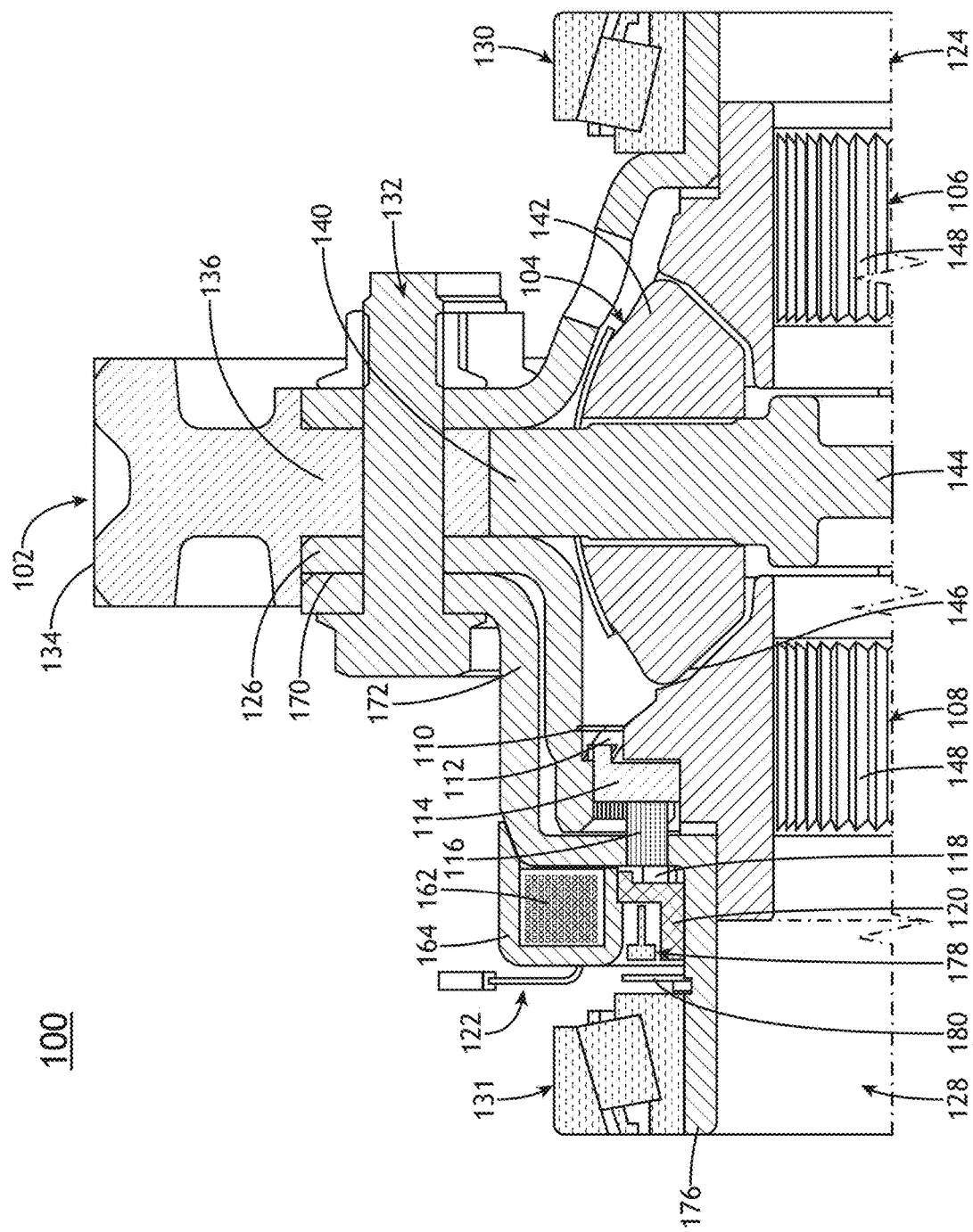
FIG. 1D depicts a cross-section view of the electric locking differential in a locked configuration, in accordance with one or more embodiments of the present disclosure.
Figure 1E:
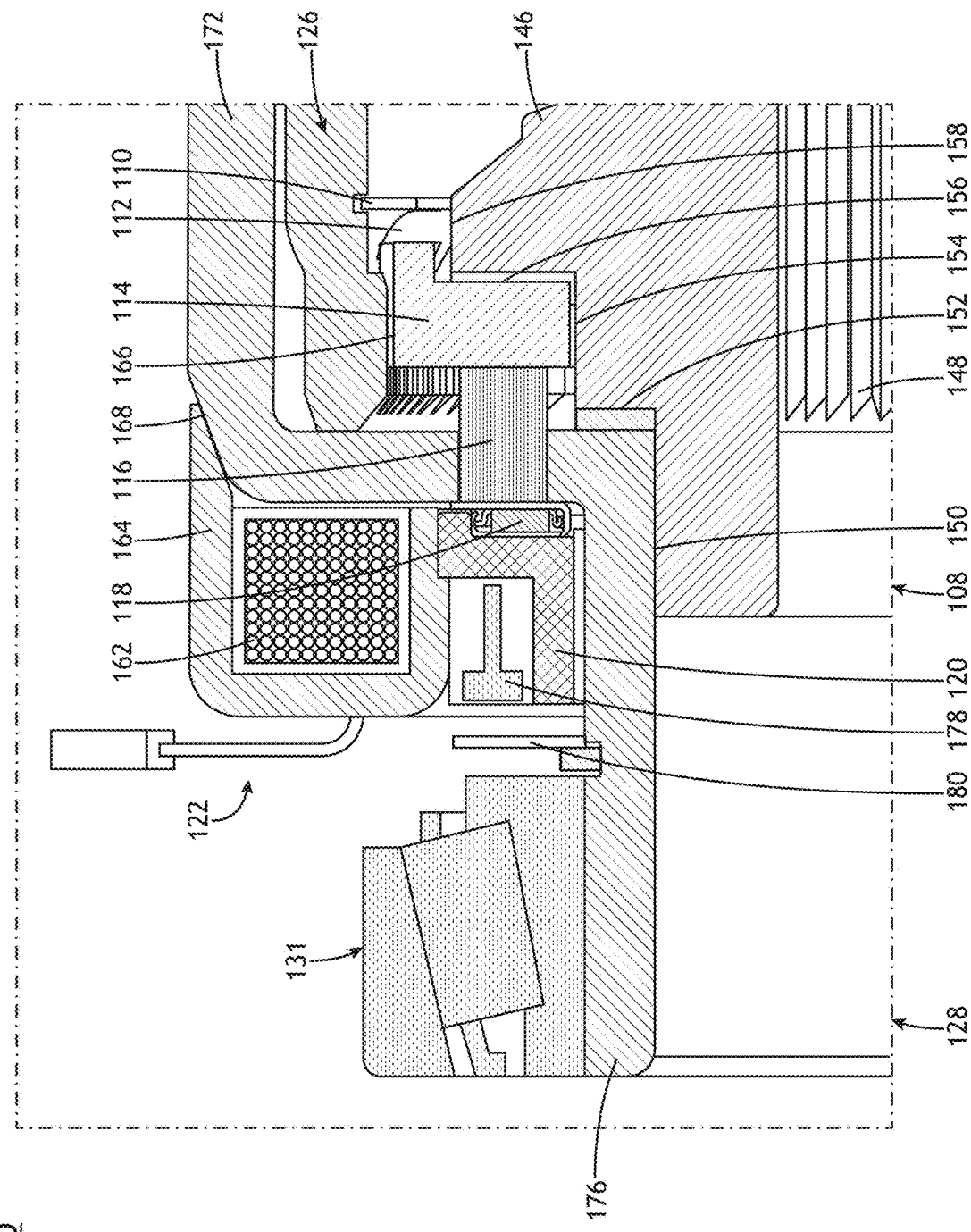
FIG. 1E depicts a partial cross-section view of the electric locking differential in the locked configuration, in accordance with one or more embodiments of the present disclosure.
Figure 1F:
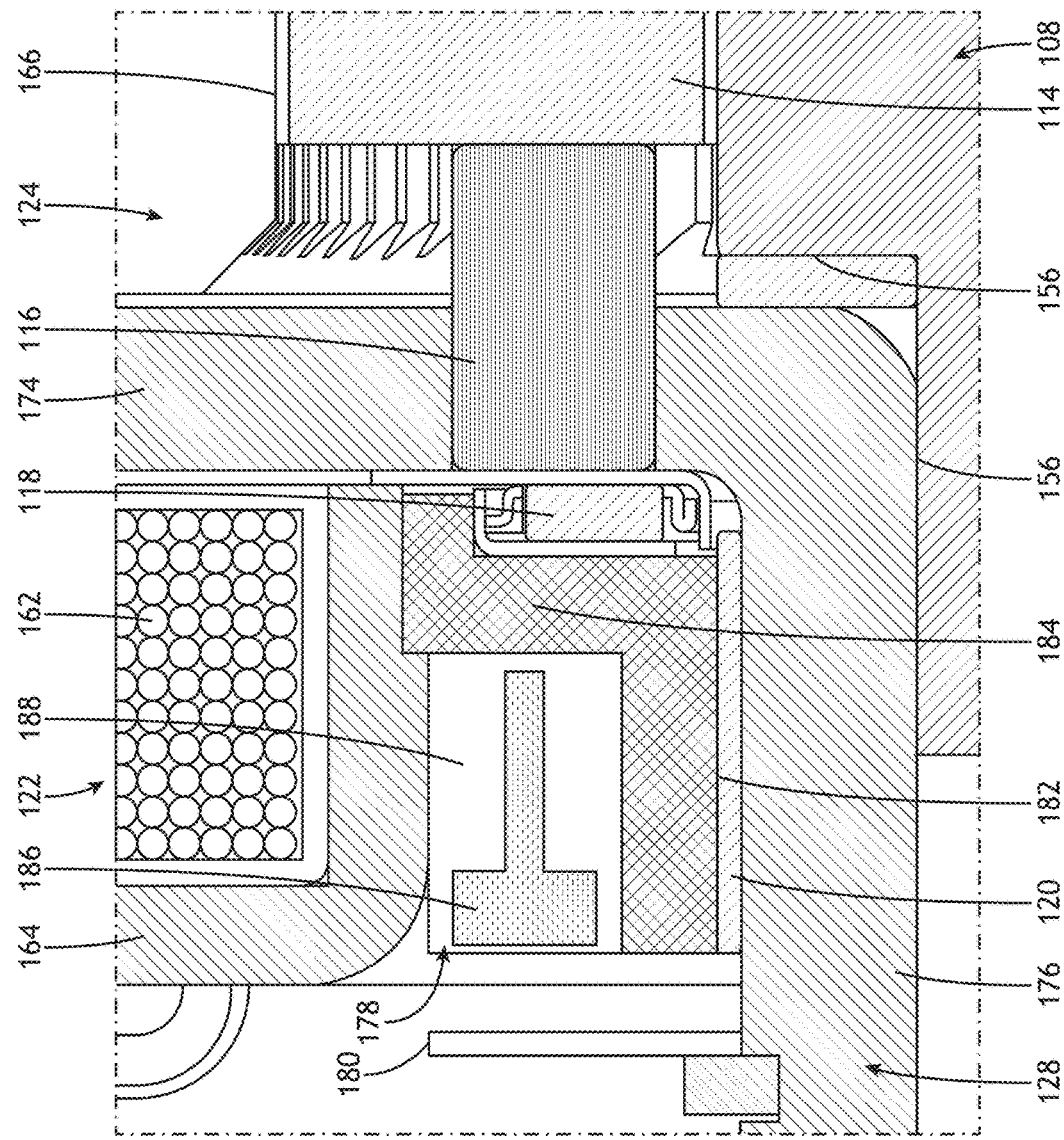
FIG. 1F depicts a partial cross-section view of the electric locking differential in the locked configuration, in accordance with one or more embodiments of the present disclosure.
Figure 1G:
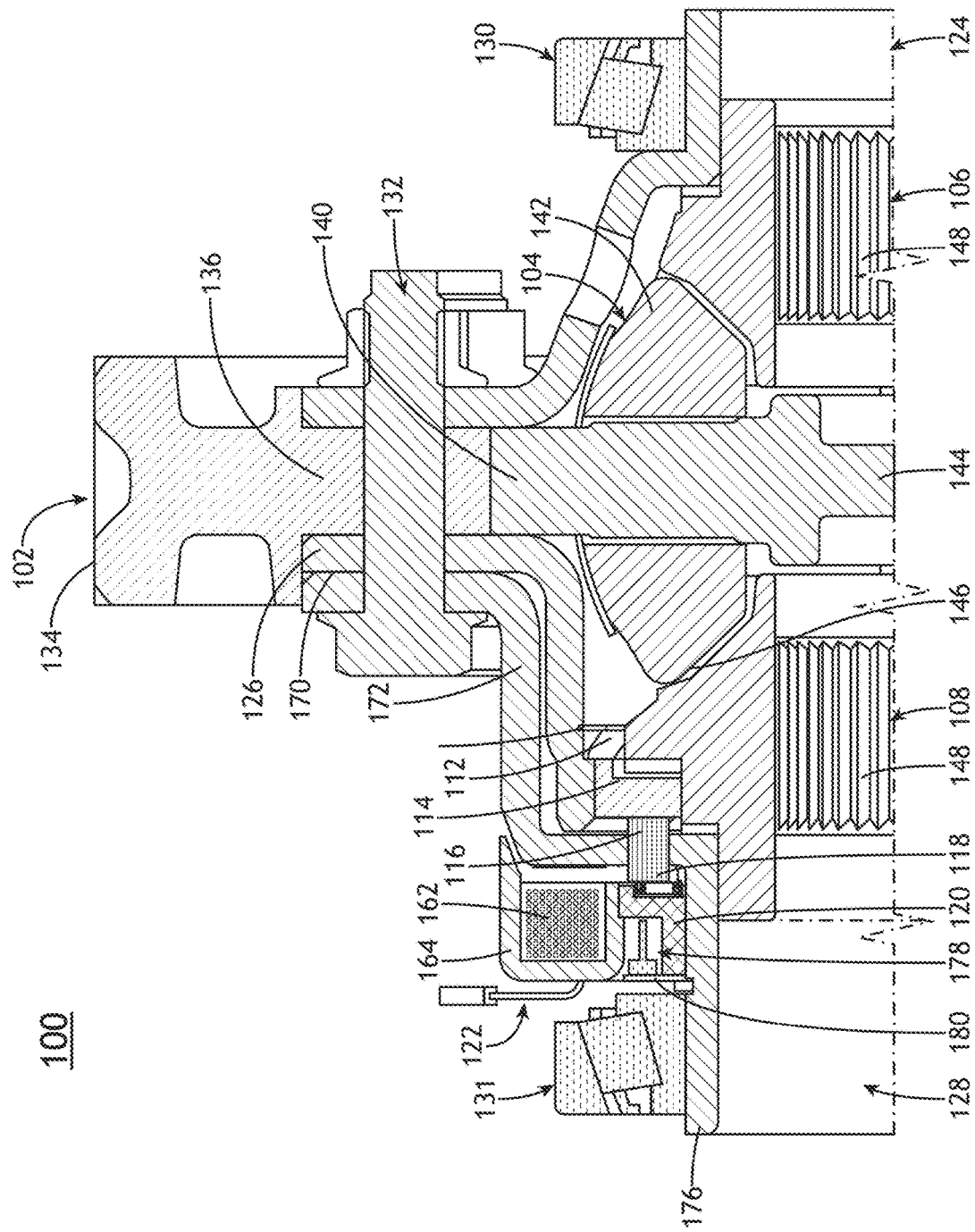
FIG. 1G depicts a cross-section view of the electric locking differential in an unlocked configuration, in accordance with one or more embodiments of the present disclosure.
Figure 1H:
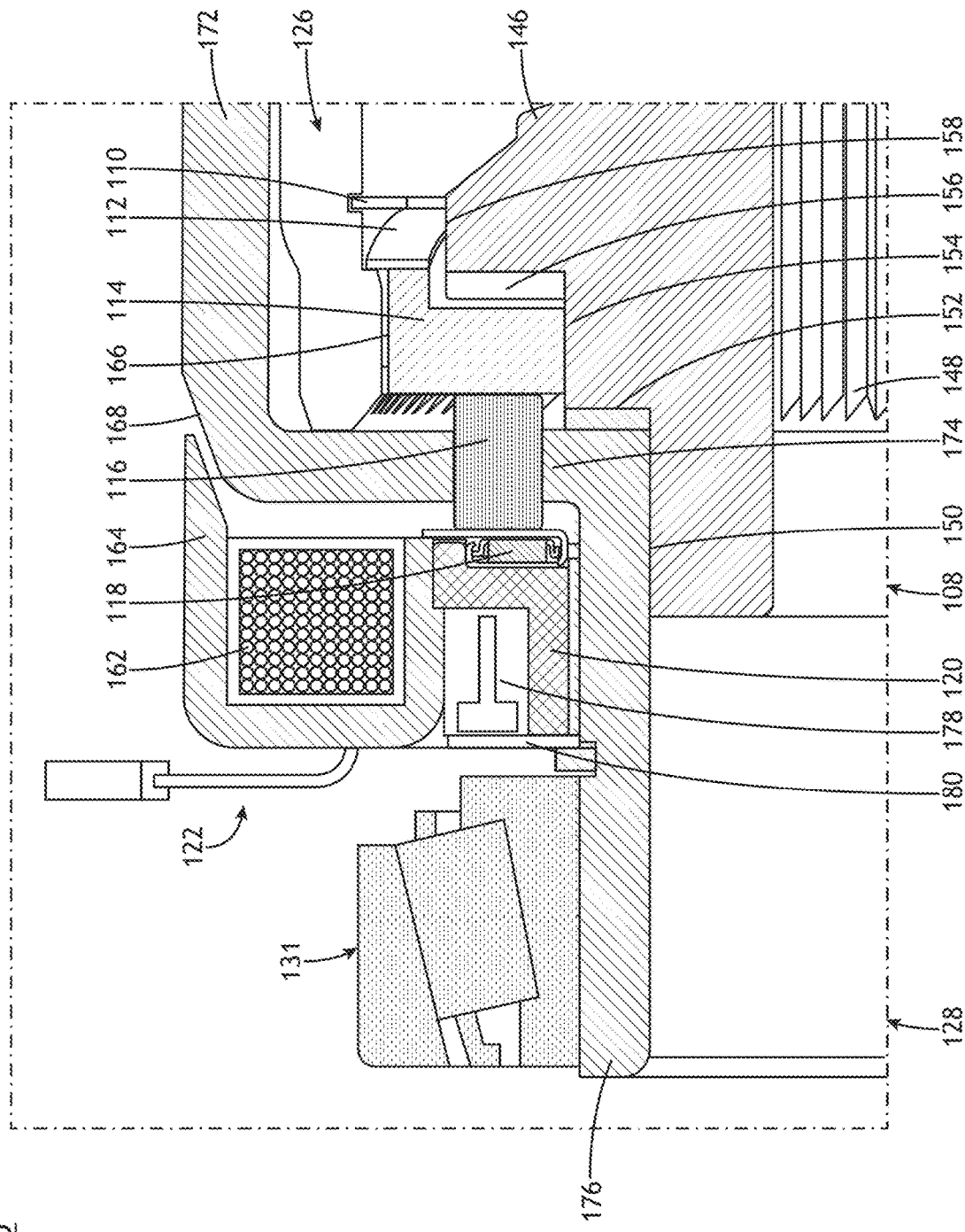
FIG. 1H depicts a partial cross-section view of the electric locking differential in the unlocked configuration, in accordance with one or more embodiments of the present disclosure.
Figure 11:
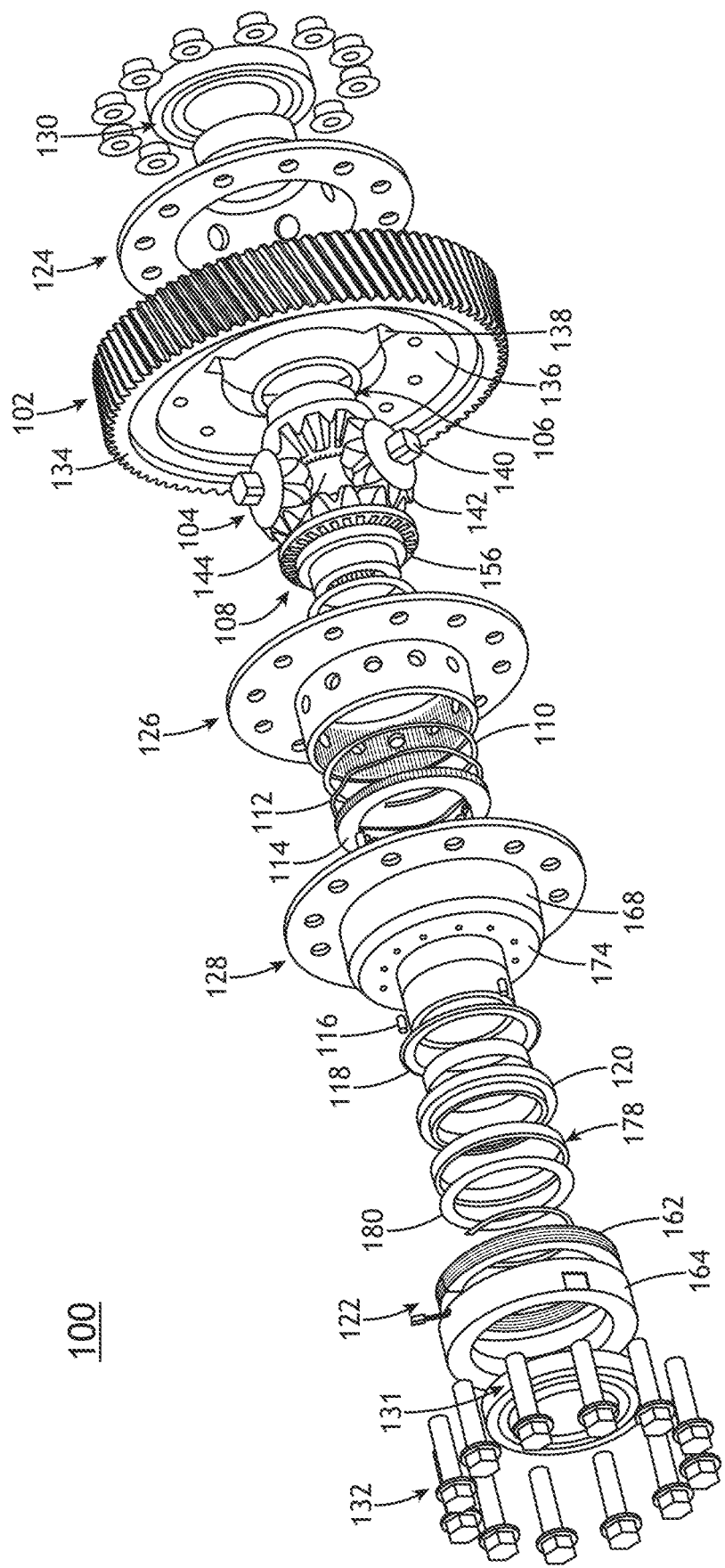
Figure 1J:
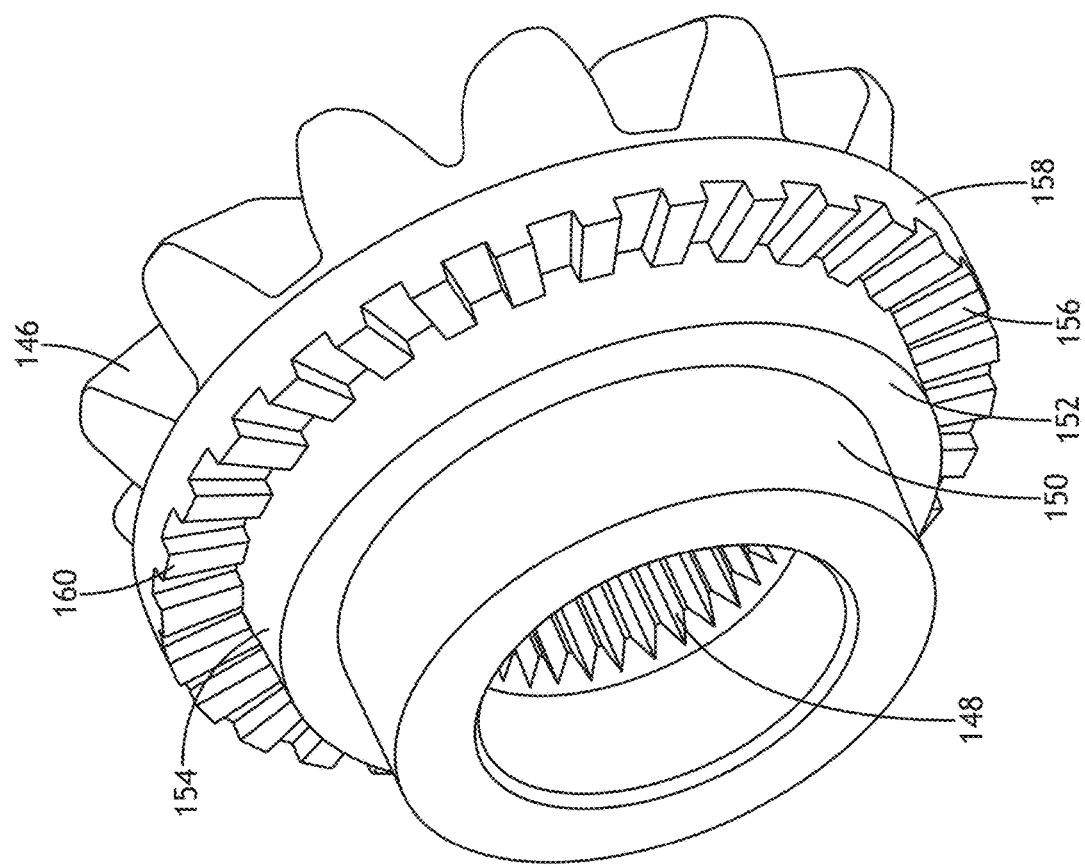
FIG. 1J depicts a perspective view of a locking side gear of the electric locking differential, in accordance with one or more embodiments of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure are directed to a locking differential position sensor. The locking differential may be an electric locking differential with a bushing and an annular position sensor which are affixed. The bushing and the annular position sensor may axially translate relative to an actuation side housing of the electric locking differential. A target ring may be affixed to the actuation side housing. The target ring may be at a fixed axial position relative to a locking side gear. The annular position sensor may be at a fixed axial position relative to a clutch plate. The annular position sensor may determine a relative axial position between the annular position sensor and the target ring. The relative axial position may indicate a relative axial position between the clutch plate and the locking side gear, thereby indicating whether the electric locking differential is locked or unlocked.

FIGS. 1A-1J depict an electric locking differential 100, according to one or more embodiments of the present disclosure. The electric locking differential 100 may include a final drive gear 102, a bevel gearset 104, a side gear 106, a locking side gear 108, a retaining ring 110, a return spring 112, a clutch plate 114, actuation pins 116, a thrust bearing 118, a bushing 120, an electromagnet 122, a side housing 124, an inner housing 126, an actuation side housing 128, a bearing 130, a bearing 131, fasteners 132, an annular position sensor 178, and/or a target ring 180.

Center axes of the electric locking differential 100, the final drive gear 102, the bevel gearset 104, the side gear 106, the locking side gear 108, the retaining ring 110, the return spring 112, the clutch plate 114, the thrust bearing 118, the bushing 120, the electromagnet 122, the side housing 124, the inner housing 126, the actuation side housing 128, the bearing 130, and/or the bearing 131 may be coincident. The actuation pins 116 and/or fasteners 132 may be radially offset from the center axis of the electric locking differential 100.

The electric locking differential 100 may be configured in an unlocked configuration and/or a locked configuration. The unlocked configuration and the locked configuration may also be referred to as an open configuration and a closed configuration, respectively.

The final drive gear 102, the bevel gearset 104, the actuation pins 116, the side housing 124, the inner housing 126, and/or the actuation side housing 128 may be configured to rotate together about the center axis of the electric locking differential 100. The final drive gear 102, the bevel gearset 104, the actuation pins 116, the side housing 124, the inner housing 126, and/or the actuation side housing 128 may rotate together when the electric locking differential 100 is in the unlocked configuration and/or in the locked configuration.

The side gear 106 and/or the locking side gear 108 may also rotate about the center axis of the electric locking differential 100. A relative speed of rotation of the side gear 106 and/or the locking side gear 108 may depend on whether the electric locking differential 100 is configured in the unlocked configuration or the locked configuration.

When the electric locking differential 100 is in the unlocked configuration, the side gear 106 and/or the locking side gear 108 may rotate independently of the final drive gear 102, the bevel gearset 104, the actuation pins 116, the side housing 124, the inner housing 126, and/or the actuation side housing 128 about the center axis of the electric locking differential 100. The side gear 106 and/or the locking side gear 108 may also rotate independently of each other when the electric locking differential 100 is in the unlocked configuration. The independent rotation of the side gear 106 and/or the locking side gear 108 when the electric locking differential 100 is in the unlocked configuration may provide differentiation for the rotational speeds of the side gear 106 and the locking side gear 108.

When the electric locking differential 100 is in the locked configuration, the side gear 106 and/or the locking side gear 108 may rotate with the final drive gear 102, the bevel gearset 104, the actuation pins 116, the side housing 124, the inner housing 126, and/or the actuation side housing 128 about the center axis of the electric locking differential 100. The side gear 106 and/or the locking side gear 108 may also rotate together when the electric locking differential 100 is in the locked configuration. The locking side gear 108 may prevent differentiation such that the side gear 106 and the locking side gear 108 rotate at the same rotational speed.

The final drive gear 102 may include an external helical gear 134 and/or a flange 136. The external helical gear 134 may face outwards away from the center axis of the final drive gear 102. The external helical gear 134 may include teeth which are set at a select angle relative to the center axis of the final drive gear 102. The final drive gear 102 may be configured to receive torque via the external helical gear 134. The flange 136 may be disposed radially inwards of and axially aligned with the external helical gear 134. The flange 136 may be annular shaped with a hole at the center axis of the final drive gear 102. The flange 136 may define recessed portions 138. The recessed portions 138 may be defined axially through the flange 136. The recessed portions 138 may extend radially outwards from the center axis of the final drive gear 102. The recessed portions 138 may open radially inwards.

The bevel gearset 104 may include pins 140, bevel gears 142, and/or a center portion 144. The bevel gearset 104 may be a rigid-body. The pins 140, the bevel gears 142, and/or the center portion 144 may be affixed together such that pins 140, the bevel gears 142, and/or the center portion 144 may not rotate and/or translate relative to one another. For example, the pins 140 may be affixed together via the center portion 144. The bevel gears 142 may be affixed to respective of the pins 140. The center portion 144 may be coincident to the center axis of the electric locking differential 100. The pins 140 may be coincident to and/or disposed within respective of the bevel gears 142. A center axis of the pins 140 and/or the bevel gears 142 may be orthogonal to the center axis of the electric locking differential 100. The pins 140 and/or the bevel gears 142 may not rotate about the center axis of the bevel gears 142. Instead, the pins 140 and/or the bevel gears 142 may rotate about the center axis of the electric locking differential 100. Thus, the pins 140 and/or the bevel gears 142 may rotate about the center axis of the bevel gearset 104 via orbital motion.

The pins 140 may be disposed within and abut the recessed portions 138. The final drive gear 102 may be configured to transmit torque received from the external helical gear 134 through the flange 136 to the bevel gearset 104 via the recessed portions 138. The pins 140 may receive the torque from the final drive gear 102 and rotate as a rigid body with the final drive gear 102.

The electric locking differential 100 may include a matching number of the recessed portions 138, the pins 140, and the bevel gears 142. The electric locking differential 100 may include any number of the recessed portions 138, the pins 140, and the bevel gears 142. For example, the electric locking differential 100 may include two, three, four, or more of the recessed portions 138, the pins 140, and the bevel gears 142. As depicted, the electric locking differential 100 includes three of the recessed portions 138, the pins 140, and the bevel gears 142, although this is not intended to be limiting.

The recessed portions 138, the pins 140, and the bevel gears 142 may be circumferentially offset from adjacent of the recessed portions 138, the pins 140, and the bevel gears 142. In embodiments, each of the recessed portions 138, the pins 140, and the bevel gears 142 are circumferentially offset from adjacent of the recessed portions 138, the pins 140, and the bevel gears 142 by a same angle. For example, the recessed portions 138, the pins 140, and the bevel gears 142 may be arranged in a polar array. The angle may be based on the number of the recessed portions 138, the pins 140, and the bevel gears 142. As depicted, each of the recessed portions 138, the pins 140, and the bevel gears 142 are circumferentially offset from adjacent of the recessed portions 138, the pins 140, and the bevel gears 142 by an angle of 120°, although this is not intended to be limiting and may vary based on the numbers of the recessed portions 138, the pins 140, and the bevel gears 142.

The side gear 106 and the locking side gear 108 may be disposed on opposing axial sides of the bevel gearset 104. The bevel gearset 104 may be disposed axially between the side gear 106 and the locking side gear 108.

The side gear 106 and/or the locking side gear 108 may be coupled to the bevel gearset 104. The side gear 106 and/or the locking side gear 108 may be coupled to the bevel gears 142 of the bevel gearset 104. The side gear 106 and/or the locking side gear 108 may form a gear mesh with the bevel gears 142. The bevel gearset 104 may be configured to transmit torque received from the pins 140 through the bevel gears 142 to the side gear 106 and/or the locking side gear 108 via the gear mesh.

The side gear 106 and/or the locking side gear 108 may be coupled to the bevel gears 142 in a crossed arrangement. For example, the center axis of the bevel gears 142 may be orthogonal to the side gear 106 and/or the locking side gear 108. The side gear 106, the locking side gear 108, and/or the bevel gears 142 may include select pitch angles to provide the crossed arrangement. The pitch angles of the side gear 106 and/or the locking side gear 108 may be the same. The pitch angles of the bevel gears 142 may be the same. The pitch angles of the side gear 106 and/or the locking side gear 108 may or may not be the same as the pitch angles of the bevel gears 142.

The side gear 106 and/or the locking side gear 108 may include an external bevel gear portion 146, an internal spline 148, an external axial surface 150, and/or a radial surface 152. The external bevel gear portion 146 of the side gear 106 and/or the locking side gear 108 may mesh with the bevel gears 142 of the bevel gearset 104. The internal spline 148 may extend axially along a select length of the locking side gear 108. The internal spline 148 may face inwards towards the center axis of the side gear 106 and/or the locking side gear 108. The external axial surface 150 may face radially outwards away from the center axis of the side gear 106 and/or the locking side gear 108. The radial surface 152 may extend radially outwards from the external axial surface 150. The radial surface 152 may be axially disposed between the external axial surface 150 and the external bevel gear portion 146.

The locking side gear 108 may include an external axial surface 154, a radial-dogged surface 156, and/or an external axial surface 158. The locking side gear 108 may include the external axial surface 154, the radial-dogged surface 156, and/or the external axial surface 158 in addition to the external bevel gear portion 146, the internal spline 148, the external axial surface 150, and/or the radial surface 152. The locking side gear 108 may be considered locking by including the external axial surface 154, the radial-dogged surface 156, and/or the external axial surface 158.

The external axial surface 154 and/or the external axial surface 158 may face radially outwards away from the center axis of the locking side gear 108. The radial surface 152 may be radially disposed between and couple the external axial surface 150 and the external axial surface 154. The radial surface 152 may also be axially disposed between the external axial surface 150 and the external axial surface 154. The external axial surface 154 may be disposed radially outwards of the external axial surface 150. The external axial surface 154 may be disposed axially between and couple the radial surface 152 and the radial-dogged surface 156. The radial-dogged surface 156 may be radially disposed between and couple the external axial surface 154 and the external axial surface 158. The radial-dogged surface 156 may also be axially disposed between the external axial surface 154 and the external axial surface 158. The external axial surface 158 may be disposed radially outwards of the external axial surface 154. The external axial surface 158 may be disposed axially between and couple the radial-dogged surface 156 and the external bevel gear portion 146. The axial positions may follow in sequence from the external axial surface 150, to the radial surface 152, to the external axial surface 154, to the radial-dogged surface 156, to the external axial surface 158, to the external bevel gear portion 146.

The external axial surface 150, the external axial surface 154, and/or the external axial surface 158 may be cylindrical surfaces which are coincident to the center axis of the locking side gear 108. The radial surface 152 may be an annular surface which is coincident to the center axis of the locking side gear 108.

The clutch plate 114 and the locking side gear 108 may be coupled by a cylindrical joint. For example, the clutch plate 114 and the external axial surface 154 of the locking side gear 108 may be coupled by the cylindrical joint. The cylindrical joint may include two degrees-of-freedom, where the clutch plate 114 is configured to axially translate relative to and rotate about the central axis relative to the locking side gear 108. The clutch plate 114 may be disposed radially outwards of and coupled to the external axial surface 154.

The electric locking differential 100 may be configured in the unlocked configuration and the locked configuration by unlocking and locking, respectively, the clutch plate 114 to the locking side gear 108. For example, the clutch plate 114 may unlock from and lock to the radial-dogged surface 156 of the locking side gear 108. The clutch plate 114 may unlock from and lock to the radial-dogged surface 156 of the locking side gear 108 by translating axially away from and translating axially towards the radial-dogged surface 156 of the locking side gear 108.

The clutch plate 114 and the locking side gear 108 may form a dog clutch in the locked configuration. For example, the clutch plate 114 and/or the radial-dogged surface 156 of the locking side gear 108 may form a dog clutch. The clutch plate 114 and/or the radial-dogged surface 156 may include dogs 160. The dogs 160 may also be referred to as dog teeth. The clutch plate 114 and/or the radial-dogged surface 156 of the locking side gear 108 may include a matching number of the dogs 160. The dogs 160 may be arranged in a polar array about the center axis of the electric locking differential. The dogs 160 of the clutch plate 114 and/or the radial-dogged surface 156 may mesh, thereby locking the clutch plate 114 to the radial-dogged surface 156 of the locking side gear 108. The clutch plate 114 may be axially translated away from the radial-dogged surface 156, thereby un-meshing the dogs 160 and unlocking the clutch plate 114 from the radial-dogged surface 156.

The retaining ring 110 and/or the return spring 112 may return the clutch plate 114, the actuation pins 116, the thrust bearing 118, the bushing 120, and/or the electromagnet 122 from the locked configuration to the unlocked configuration when the electromagnet 122 is disengaged. The clutch plate 114 may axially translate away from the locking side gear 108 by the retaining ring 110 and/or the return spring 112. The retaining ring 110 may be a snap ring or the like. The return spring 112 may be a compression spring. For example, the return spring 112 may be a wave-type compression spring. The retaining ring 110 and/or the return spring 112 may be disposed radially outwards of and/or axially aligned with the locking side gear 108. For example, the retaining ring 110 and/or the return spring 112 may be disposed radially outwards of and/or axially aligned with the external axial surface 158. The return spring 112 may be axially disposed between, radially aligned with, and couple the retaining ring 110 and the clutch plate 114. The return spring 112 may force the clutch plate 114 away from the retaining ring 110. The return spring 112 forcing the clutch plate 114 away from the retaining ring 110 may axially translate the clutch plate 114 away from the radial-dogged surface 156 of the locking side gear 108, thereby unlocking the clutch plate 114 from the locking side gear 108.

The electromagnet 122 may configure the electric locking differential 100 from the unlocked configuration to the locked configuration when the electromagnet 122 is engaged. The clutch plate 114 may be configured to axially translate towards the locking side gear 108 by the actuation pins 116, the thrust bearing 118, the bushing 120, and/or the electromagnet 122. The actuation pins 116, the thrust bearing 118, and/or the bushing 120 may be radially aligned with the clutch plate 114. The actuation pins 116 may be axially disposed between, radially aligned with, and couple the thrust bearing 118 and the clutch plate 114. The clutch plate 114 may be axially disposed between, radially aligned with, and couple the actuation pins 116 and the bushing 120. The electromagnet 122 may be disposed radially outwards of, axially aligned with, and affixed to the bushing 120. The electromagnet 122 may be configured to generate an electromagnetic field.

The electromagnet 122 may include coils 162 and a ferrous housing 164. The electromagnet 122 may be engaged by the coils 162. The coils 162 may be configured to generate the electromagnetic field in response to an electric current through the coils 162. The electromagnetic field may axially translate the electromagnet 122 towards the actuation side housing 128. The axially translation of the electromagnet 122 towards the actuation side housing 128 may cause axial translation of the clutch plate 114, the actuation pins 116, the thrust bearing 118, the bushing 120, and/or the electromagnet 122. The return spring 112 may resist against the axial translation. The electromagnetic field may be sufficiently strong to overcome the return spring 112, thereby axially translating the clutch plate 114 from the unlocked configuration to the locked configuration when the electromagnet 122 generates the electromagnetic field. The return spring 112 may then return the clutch plate 114 to the unlock configuration when the electromagnetic field is removed after disengaging the electromagnet 122.

The clutch plate 114, the actuation pins 116, the thrust bearing 118, the bushing 120, and/or the electromagnet 122 may be configured to axially translate a select distance between the unlocked configuration and the locked configuration. For example, the clutch plate 114, the actuation pins 116, the thrust bearing 118, the bushing 120, and/or the electromagnet 122 may be configured to axially translate between 1 and 3 mm between the unlocked configuration and the locked configuration.

The side housing 124, the inner housing 126, and/or the actuation side housing 128 may be affixed to the final drive gear 102. The side housing 124, the inner housing 126, and/or the actuation side housing 128 may rotate with the final drive gear 102 by being affixed to the final drive gear 102. For example, the side housing 124, the inner housing 126, and/or the actuation side housing 128 may be affixed to the flange 136 of the final drive gear 102. The side housing 124 may be affixed to a first side of the flange 136 and the inner housing 126 and/or the actuation side housing 128 may be affixed to a second side of the flange opposed to the first side. The inner housing 126 may be affixed between the flange 136 and the actuation side housing 128. The flange 136 may be axially disposed between the side housing 124 and one or more of the inner housing 126 and/or the actuation side housing 128. The inner housing 126 may be axially disposed between the actuation side housing 128 and the flange 136.

The path through which the torque transfers from the final drive gear 102, through the bevel gearset 104, to the side gear 106 and/or the locking side gear 108 may not pass through the side housing 124, the inner housing 126, and/or the actuation side housing 128 when in the unlocked configuration. The torque does not transfer through the side housing 124, the inner housing 126, and/or the actuation side housing 128 due to the interface between the pins 140 and the recessed portions 138. Thus, the torque on the side housing 124, the inner housing 126, and/or the actuation side housing 128 may be relatively low when the final drive gear 102 receives the torque. Such arrangement may be beneficial to enable to reducing a strength requirement of the side housing 124, the inner housing 126, and/or the actuation side housing 128.

The side housing 124, the inner housing 126, and/or the actuation side housing 128 may include one or more portions. For example, the actuation side housing 128 may include a flange portion 170, an axial portion 172, a radial portion 174, and/or an axial portion 176. By way of another example, the inner housing 126 may include the flange portion 170 and/or an axial portion 172. By way of another example, the actuation side housing 128 may include the flange portion 170 and/or the axial portion 176.

The flange portion 170 of the side housing 124, the inner housing 126, and/or the actuation side housing 128 may be coupled to the flange 136 of the final drive gear 102. For example, the flange portion 170 of the side housing 124 and the inner housing 126 may be radially aligned with and abut opposing axial sides of the flange 136 of the final drive gear 102. The flange portion 170 of the actuation side housing 128 and the flange 136 of the final drive gear 102 may be radially aligned with and abut opposing axial sides of the flange portion 170 of the inner housing 126.

The axial portion 172 of the inner housing 126 and/or the actuation side housing 128 may be disposed radially inwards from and axially extend from the flange portion 170 of the inner housing 126 and/or the actuation side housing 128, respectively. The axial portion 172 of the inner housing 126 may be axially aligned with, disposed radially inwards of, and abutting the axial portion 172 of the actuation side housing 128.

The radial portion 174 of the actuation side housing 128 may be extend radially inwards from the axial portion 172 of the actuation side housing 128. The flange portion 170 and the radial portion 174 of the actuation side housing 128 may disposed at opposing axial ends of the axial portion 172 of the actuation side housing 128.

The axial portion 176 of the actuation side housing 128 may be disposed radially inwards from and axially extend from the radial portion 174 of the actuation side housing 128. The axial portion 172 and the axial portion 176 of the inner housing 126 may extend in opposing axial directions from the radial portion 174 of the actuation side housing 128.

The axial portion 176 of the side housing 124 may be radially aligned with and axially offset from the axial portion 176 of the actuation side housing 128.

The final drive gear 102, the side housing 124, the inner housing 126, and/or the actuation side housing 128 may house one or more components of the electric locking differential 100. For example, the final drive gear 102, the side housing 124, the inner housing 126, and/or the actuation side housing 128 may house the bevel gearset 104, the side gear 106, the locking side gear 108, the retaining ring 110, the return spring 112, the clutch plate 114, and/or the actuation pins 116. The bevel gears 142 of the bevel gearset 104 and/or the side gear 106 may be disposed radially inwards of and axially aligned with the side housing 124. The bevel gears 142 of the bevel gearset 104, the locking side gear 108, the retaining ring 110, the return spring 112, and/or the clutch plate 114 may be radially disposed within and axially aligned with the inner housing 126 and/or the actuation side housing 128. The side housing 124 and the inner housing 126 may axially maintain the pins 140 within the recessed portions 138.

The side gear 106 and/or the locking side gear 108 may couple to the side housing 124 and the actuation side housing 128, respectively, by a revolute joint. The side gear 106 and/or the locking side gear 108 may be configured to rotate relative to the side housing 124 and the actuation side housing 128, respectively, by the revolute joint, when in the unlocked configuration. The external axial surface 150 of the side gear 106 and/or the locking side gear 108 may abut the side housing 124 and the actuation side housing 128, respectively. For example, the external axial surface 150 may abut the side housing 124 and the actuation side housing 128 by a wear bushing. The wear bushing may be between the external axial surface 150 and the radial portion 174 of the actuation side housing 128. The radial surface 152 of the side gear 106 and/or the locking side gear 108 may be separated from the side housing 124 and the inner housing 126, respectively, by a clearance fit. The clearance fit may be between the side gear 106 and an inner diameter of the axial portion 176 of the side housing 124. The clearance fit may be between the locking side gear 108 and an inner diameter of the axial portion 176 of the actuation side housing 128. The wear bushing and/or the clearance fit may form the revolute joint.

The clutch plate 114 may be configured to translate axially relative to the final drive gear 102, the side housing 124, the inner housing 126, and/or the actuation side housing 128. The clutch plate 114 and the inner housing 126 may be coupled by a spline 166. The spline 166 of the clutch plate 114 may be an exterior spline which faces outward away from the center axis of the clutch plate 114. The spline 166 of the inner housing 126 may be an inner spline which faces inward towards the center axis of the inner housing 126. The spline 166 of the inner housing 126 may be formed on an inner diameter of the axial portion 172 of the inner housing 126. The spline 166 of the clutch plate 114 and the inner housing 126 may mesh. The spline 166 may prismatically couple the clutch plate 114 and the inner housing 126. For example, the clutch plate 114 and the inner housing 126 may be coupled by a prismatic joint with one degree-of-freedom, where the clutch plate 114 may axially translate relative to the inner housing 126 but not experience any other form of translation or rotation relative to the inner housing 126.

The clutch plate 114 may lock the locking side gear 108 to the inner housing 126 when in the locked configuration. For example, the spline 166 may lock the locking side gear 108 to the inner housing 126 when the clutch plate 114 is coupled to the locking side gear 108. The torque may be transmitted from the dogs 160 of the locking side gear 108 through the spline 166 to the inner housing 126. The inner housing 126 and/or the actuation side housing 128 may carry a portion of the torque when the clutch plate 114 is coupled to the locking side gear 108. Thus, the addition of the inner housing 126 may strengthen the actuation side housing 128 for carrying the torque from the locking side gear 108 to the inner housing 126. Locking the locking side gear 108 to the inner housing 126 may also lock the final drive gear 102 and/or the bevel gearset 104 with the locking side gear 108. Locking the locking side gear 108 to the locking side gear 108 may then lock together the bevel gearset 104, the side gear 106, the locking side gear 108, preventing differential rotation. Although the electric locking differential is described as including the inner housing 126, this is not intended as a limitation of the present disclosure. The functionality of the inner housing 126 may be replaced by the actuation side housing 128. For example, the actuation side housing 128 may include the spline 166. However, the inner housing 126 may be beneficial to improve a strength of the electric locking differential 100.

The retaining ring 110 may be affixed to the inner housing 126. For example, the retaining ring 110 may be affixed to the inner diameter of the axial portion 172 of the inner housing 126. Although the retaining ring 110 is described as affixed to the inner housing 126, this is not intended as a limitation of the present disclosure. It is further contemplated that the retaining ring 110 may be affixed to the external axial surface 158 of the locking side gear 108.

The actuation pins 116 may be configured to translate through the actuation side housing 128. For example, the actuation pins 116 may translate through the radial portion 174 of the actuation side housing 128. The actuation pins 116 and the actuation side housing 128 may be coupled by a prismatic joint. The prismatic joint may include one degree-of-freedom, where the actuation pins 116 are configured to axially translate relative to the actuation side housing 128. The actuation pins 116 may rotate together with the rotation of the actuation side housing 128. The prismatic joint between the actuation pins 116 and the actuation side housing 128 may be through the radial portion 174 of the actuation side housing 128. For example, the radial portion 174 may define keyed-holes through which the actuation pins 116 may translate.

The bushing 120 and the electromagnet 122 may not rotate together with the final drive gear 102. The bushing 120 and the actuation side housing 128 may be coupled by a cylindrical joint. The cylindrical joint may include two degrees-of-freedom, where the bushing 120 is configured to axially translate relative to the actuation side housing 128 and rotate about the central axis relative to the actuation side housing 128. The cylindrical joint may be along an inner diameter of the bushing 120 and an outer diameter of the axial portion 176 of the actuation side housing 128. Thus, the bushing 120 may be a rotational and axial bushing. The actuation pins 116 may interface with the thrust bearing 118, allowing force on the actuation pins 116 when the final drive gear 102 is rotating and with the electromagnet 122 remaining stationary. The thrust bearing 118 may couple the axial translation of the bushing 120 and the electromagnet 122 to the actuation pins 116 and the clutch plate 114, without coupling the rotation of the final drive gear 102 through the actuation side housing 128 and the actuation pins 116 to the bushing 120 and the electromagnet 122.

The side housing 124, the inner housing 126, and/or the actuation side housing 128 may be made of a select material. For example, the side housing 124, the inner housing 126, and/or the actuation side housing 128 may be made of a ferrous material (e.g., ferrous steel). The electromagnet 122 may cause the electromagnetic field to couple through the ferrous housing 164 to the actuation side housing 128 when the electromagnet 122 is engaged. The ferrous housing 164 may be coupled directly to the actuation side housing 128.

The ferrous housing 164 may not touch the actuation side housing 128 when the electric locking differential 100 is in the unlocked configuration and/or the locked configuration. The thrust bearing 118 and the bushing 120 may maintain a gap between the ferrous housing 164 and the actuation side housing 128 in the locked configuration.

The ferrous housing 164 and the actuation side housing 128 may include a chamfered edge 168. The electromagnetic field may couple from the ferrous housing 164 to the actuation side housing 128 through the chamfered edge 168. The chamfered edge 168 may be a conical magnetic pole interface between the chamfered edge 168 and the actuation side housing 128. The chamfered edge 168 of the ferrous housing 164 may face inwards towards the center axis of the electromagnet 122. The chamfered edge 168 of the actuation side housing 128 may face outwards away from the center axis of the actuation side housing 128. The chamfered edge 168 of the actuation side housing 128 may be formed between the axial portion 172 and the radial portion 174 of the actuation side housing 128. The actuation side housing 128 may be formed with the chamfered edge 168. For example, the actuation side housing 128 may be formed with the chamfered edge 168 during stamping or the chamfered edge 168 may be machined after stamping.

The ferrous housing 164 may be U-shaped with an open portion which faces axially towards the actuation side housing 128. For example, the open portion which faces axially towards the radial portion 174 of the actuation side housing 128. The chamfered edge 168 may be defined on a tip of the U-shape. The coils 162 may be disposed within the center of the U-shape.

The bearing 130 and the bearing 131 may be disposed at opposing axial ends of the electric locking differential 100. The bearing 130 and the bearing 131 may be coupled to the side housing 124 and the actuation side housing 128, respectively. For example, the bearing 130 and the bearing 131 may be coupled to external diameter of the axial portion 176 of the side housing 124 and the axial portion 176 of the actuation side housing 128. The bearing 131 may be radially aligned with the bushing 120. The side housing 124 and the actuation side housing 128 may support the electric locking differential 100 via the bearing 130 and the bearing 131. The final drive gear 102 may be supported by the bearing 130 and the bearing 131 through the side housing 124 and the actuation side housing 128. The side housing 124 and the actuation side housing 128 may support the final drive gear 102 such that the final drive gear 102 does not deflect when the final drive gear 102 receives a large torque.

The bearing 130 and the bearing 131 may include any type of radial bearing. For example, the bearing 130 and the bearing 131 may include a cylindrical bearing, a taper roller bearing, a needle bearing, a ball bearing, a plain bearing (e.g., a bushing), or the like. As depicted, the bearing 130 and the bearing 131 are taper roller bearings, although this is not intended to be limiting.

The final drive gear 102, the side housing 124, the inner housing 126, and/or the actuation side housing 128 may be affixed using any suitable technique, such as, the fasteners 132, a weld, or the like. For example, the final drive gear 102, the side housing 124, the inner housing 126, and/or the actuation side housing 128 may be affixed using the fasteners 132. The fasteners 132 may be disposed in holes through the final drive gear 102, the side housing 124, the inner housing 126, and/or the actuation side housing 128. The fasteners 132 may clamp together the final drive gear 102, the side housing 124, the inner housing 126, and/or the actuation side housing 128. Although the electric locking differential 100 is described as including the fasteners 132, this is not intended as a limitation of the present disclosure. The final drive gear 102, the side housing 124, the inner housing 126, and/or the actuation side housing 128 may be affixed using a weld, or the like. The weld may be an edge weld around an outer diameter of flange portion 170 of the side housing 124, the inner housing 126, and/or the actuation side housing 128.

The side housing 124, the inner housing 126, and/or the actuation side housing 128 may be stamped. For example, the side housing 124, the inner housing 126, and/or the actuation side housing 128 may be cold-formed stamped. The configuration of the electric differential may allow stamping the side housing 124, the inner housing 126, and/or the actuation side housing 128, retaining the functionality of the unlocked configuration and the locked configuration, and meeting a select strength requirement for the housings. The inner housing 126 and the actuation side housing 128 may also be formed as an integral unit. However, separating the inner housing 126 and the actuation side housing 128 outer housing may enable stamping the inner housing 126 and the actuation side housing 128.

The bushing 120, the electromagnet 122, and the annular position sensor 178 may be affixed. The bushing 120, the electromagnet 122, and the annular position sensor 178 may rotate and/or axially translate together.

The bushing 120 may include an axial portion 182 and a radial portion 184. The radial portion 184 may extend radially outwards from an axial end of the axial portion 182. The radial portion 184 of the bushing 120 may be affixed to the electromagnet 122, couple to the thrust bearing 118, and/or be affixed to the annular position sensor 178. The radial portion 184 of the bushing 120 may be affixed to the ferrous housing 164 of the annular position sensor 178. The axial portion 182 of the bushing 120 may form the cylindrical joint with the actuation side housing 128 and/or be affixed to the annular position sensor 178.

The annular position sensor 178 may include sensor electronics 186 and/or a sensor housing 188. The sensor housing 188 may be an annular shape. The sensor housing 188 may house the sensor electronics 186.

The sensor housing 188 may be affixed to the bushing 120 and/or the electromagnet 122. The sensor housing 188 may be affixed to the axial portion 182 and/or the radial portion 184 of the bushing 120. The sensor housing 188 may be affixed to ferrous housing 164 of the electromagnet 122.

The sensor electronics 186 may be enclosed within the sensor housing 188. The sensor electronics 186 may include a printed circuit board, position sensors, a connector, and the like. The shape of the sensor electronics 186 may vary depending on the implementation of the sensor electronics 186. The sensor electronics 186 may include one or more of the position sensors. The position sensors may be circumferentially arranged around the annular position sensor 178. The sensor electronics 186 may average position measurements from multiple of the position sensors.

The sensor electronics 186 may include any suitable type of position sensor. For example, the sensor electronics 186 may include inductive position sensors (e.g., an inductive linear position sensor), magnetic position sensors, or the like. The inductive position sensors may be more accurate than the magnetic position sensors due to the position of the annular position sensor 178 radially within the electromagnet 122 and the electromagnetic fields generated by the electromagnet 122. The inductive position sensors may not read the electromagnetic field generated by the electromagnet 122 as noise.

The annular position sensor 178 may be axially aligned with, disposed radially inwards of, and affixed to the electromagnet 122. The annular position sensor 178 may be axially aligned with, radially disposed between, and affixed to the axial portion 182 of the bushing 120 and the electromagnet 122. The annular position sensor 178 may be axially offset from, radially aligned with, and affixed to the radial portion 184 of the bushing 120. The axial portion 182 and/or the radial portion 184 may be axially aligned with and disposed radially inwards of the electromagnet 122. The radial portion 184 may be axially disposed between the annular position sensor 178 and the thrust bearing 118. The bushing 120 and the electromagnet 122 may define a cavity therebetween. For example, the axial portion 182 and the radial portion 184 of the bushing 120 may define a cavity between the electromagnet 122. The annular position sensor 178 may be affixed to the bushing 120 and the electromagnet 122 in the cavity. The geometry of the bushing 120 may enable affixing the annular position sensor 178 radially between the bushing 120 and electromagnet 122. The position of the annular position sensor 178 relative to the bushing 120 and the electromagnet 122 may be beneficial for reducing a package size of the electric locking differential 100. For example, the axial alignment of the annular position sensor 178 with the bushing 120 and the electromagnet 122 together with disposed the annular position sensor 178 radially between the bushing 120 and the electromagnet 122 may provide compact packaging.

The clutch plate 114, the actuation pins 116, the thrust bearing 118, the bushing 120, the electromagnet 122, and the annular position sensor 178 may axially translate together. For example, the clutch plate 114, the actuation pins 116, the thrust bearing 118, the bushing 120, the electromagnet 122, and the annular position sensor 178 may axially translate together between the unlocked configuration and the locked configuration. The clutch plate 114 and the actuation pins 116 may rotate together with the final drive gear 102, the inner housing 126, and/or the actuation side housing 128 while the bushing 120, the electromagnet 122, and the annular position sensor 178 remain stationary due to the thrust bearing 118.

The axial position of the clutch plate 114 relative to the annular position sensor 178 may be fixed. For example, the axial position of the clutch plate 114 relative to the annular position sensor 178 may be fixed by the clutch plate 114, the actuation pins 116, the thrust bearing 118, the bushing 120, the electromagnet 122, and the annular position sensor 178 may axially translating together. A relative axial position of the annular position sensor 178 may indicate a relative axial position of the clutch plate 114 by the axial position of the clutch plate 114 relative to the annular position sensor 178 being fixed.

The target ring 180 may be affixed to the actuation side housing 128. For example, the target ring 180 may be affixed to an outer diameter of the axial portion 176 of the actuation side housing 128. The target ring 180 may be affixed to the actuation side housing 128 by snap ring, a weld, or the like. The target ring 180 may rotate together with the actuation side housing 128. The target ring 180 may be radially aligned with and axially offset from the annular position sensor 178. The target ring 180 may be axially disposed between the bearing 131 and the annular position sensor 178.

The target ring 180 may be made of a select metal. For example, the target ring 180 may be non-ferrous metal such as aluminum or non-ferrous stainless steel.

The axial position of the target ring 180 to the locking side gear 108 may be fixed. The axial position of the target ring 180 to the locking side gear 108 may be fixed by affixing the target ring 180 to the actuation side housing 128 and coupling the locking side gear 108 and the actuation side housing 128 by the revolute joint. A relative axial position of the target ring 180 may indicate a relative axial position of the radial-dogged surface 156 by the axial position of the target ring 180 relative to the radial-dogged surface 156 being fixed.

The target ring 180 may be an annular shape with no pattern. The target ring 180 may provide a constant surface from which the annular position sensor 178 may detect a relative axial position.

The annular position sensor 178 may detect the relative axial position from the annular position sensor 178 to the target ring 180. The relative axial position from the annular position sensor 178 to the target ring 180 may indicate the relative axial position from the clutch plate 114 to the radial-dogged surface 156 of the locking side gear 108. For example, the relative axial position from the annular position sensor 178 to the target ring 180 may indicate the relative axial position from the clutch plate 114 to the radial-dogged surface 156 of the locking side gear 108 because the axial position from the annular position sensor 178 to the clutch plate 114 is fixed and the axial position from the target ring 180 to the radial-dogged surface 156 of the locking side gear 108 is fixed.

The relative axial position from the annular position sensor 178 to the target ring 180 may also indicate whether the electric locking differential 100 is in the unlocked configuration or the locked configuration. For example, the relative axial position from the clutch plate 114 to the radial-dogged surface 156 of the locking side gear 108 may indicate the electric locking differential 100 is in the unlocked configuration when the relative axial position indicates the clutch plate 114 is not adjacent to and therefore does not form the gear mesh with the radial-dogged surface 156 and is in the locked configuration when the clutch plate 114 is adjacent to and therefore forms the gear mesh with the radial-dogged surface 156. Thus, the relative axial position between the annular position sensor 178 and the target ring 180 may indicate the electric locking differential 100 is configured in the unlocked configuration or the locked configuration.

The relative axial position from the annular position sensor 178 to the target ring 180 may be used as feedback for controlling the electric locking differential 100. For example, the relative axial position from the annular position sensor 178 to the target ring 180 may be used as feedback for controlling the torque to the final drive gear 102 and/or for controlling the electromagnet 122. The torque to the final drive gear 102 may be controlled depending on whether the electric locking differential 100 is in the unlocked configuration or the locked configuration. Similarly, the electromagnet 122 may be controlled to ensure the electric locking differential 100 remains in the unlocked configuration or the locked configuration.

Figure 2:
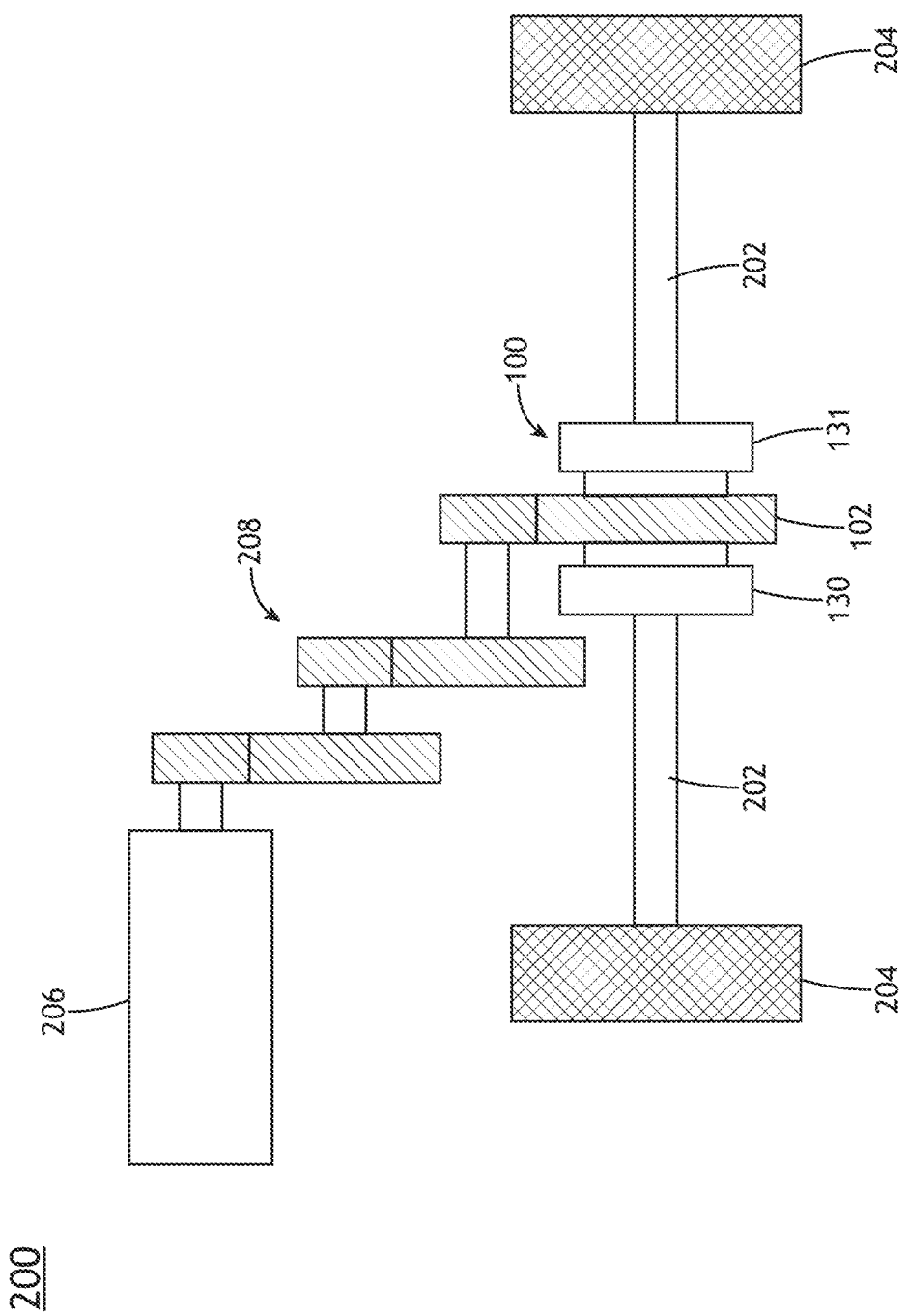
FIG. 2 simplified diagram of a powertrain including the electric locking differential, in accordance with one or more embodiments of the present disclosure.

FIG. 2 depicts a powertrain 200, in accordance with one or more embodiments of the present disclosure. The powertrain 200 may be part of an electric axle (e-axle), a hybrid transmission, an internal combustion powertrain, or the like. The powertrain 200 may be used in vehicle, such as a passenger car, truck, sport-utility vehicle, or crossover. For example, the powertrain 200 may be a powertrain of a front wheel drive transmission vehicle.

The powertrain 200 may include the electric locking differential 100, a pair of axles 202, a pair of driven wheels 204, a motor 206, and/or a transmission 208. The motor 206 may be mounted off-axis to the center axis of the electric locking differential 100. The motor 206 may include an electric motor, an internal combustion engine, a hybrid motor, or the like. The motor 206 may couple to the final drive gear 102 of the electric locking differential. For example, the motor 206 may couple to the final drive gear 102 through the transmission 208. The transmission 208 may couple torque from the motor 206 to the final drive gear 102. The transmission 208 may step down the torque from the motor 206 to the final drive gear 102. The transmission 208 may include one or more gear meshes for stepping down the motor 206 to the final drive gear 102. The transmission 208 may include any number of the gear meshes to achieve a desired gear ratio between the motor 206 and the final drive gear 102.

The axles 202 may be coupled on-axis to the electric locking differential 100. For example, the axles 202 may be coupled to the internal spline 148 of respective of the side gear 106 and the locking side gear 108. The electric locking differential 100 may transmit the torque from the final drive gear 102 to the axles 202. The driven wheels 204 may be coupled to respective of the axles 202. The axles 202 may transmit the torque to the driven wheels 204.

The electric locking differential 100 may provide differentiation to the axles 202 and/or driven wheels 204 when the electric locking differential 100 is in the unlocked configuration and may lock together the rotation of the axles 202 and/or driven wheels 204 when the electric locking differential 100 is in the locked configuration.

The bearing 130 and the bearing 131 may support the electric locking differential 100 from a frame of the vehicle of the powertrain 200.

The term "axial" and derivatives thereof, such as "axially," shall be understood to refer to a direction along the axis of a rotor shaft configured to rotate about the axis in operation of the apparatus described herein. Further, the term "radial" and derivatives thereof, such as "radially," shall be understood in relation to the axis of the aforementioned rotor shaft. For example, "radially outwards" refers to further away from the axis, while "radially inwards" refers to nearer to the axis. The term "circumferential" and derivatives thereof, such as "circumferentially," shall be understood in relation to the axis of the rotor shaft.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 electric Locking Differential
102 Final Drive Gear
104 Bevel Gearset
106 Side Gear
108 Locking Side Gear
110 Retaining Ring
112 Return Spring
114 Clutch Plate
116 Actuation Pins
118 Thrust Bearing
120 Bushing
122 Electromagnet
124 Side Housing
126 Inner Housing
128 Actuation Side Housing
130 Bearing
131 Bearing
132 Fasteners
134 External Helical Gear
136 Flange
138 Recessed Portions
140 Pins
142 Bevel Gears
144 Center Portion
146 External Bevel Gear Portion
148 Internal Spline
150 External Axial Surface
152 Radial Surface
154 External Axial Surface
156 Radial-Dogged Surface
158 External Axial Surface
160 Dogs
162 Coils
164 Ferrous Housing
166 Spline
168 Chamfered Edge
170 Flange Portion
172 Axial Portion
174 Radial Portion
176 Axial Portion
178 Annular Position Sensor
180 Target Ring
182 Axial Portion
184 Radial Portion
186 Sensor Electronics
188 Sensor Housing
200 Powertrain 202 Axles
204 Driven Wheels
206 Motor
208 Transmission

What is claimed:

1. An electric locking differential comprising:
a final drive gear, wherein the final drive gear comprises an external helical gear and a flange, wherein the flange is disposed radially inwards of and axially aligned with the external helical gear;
an actuation side housing, wherein the actuation side housing is affixed to the flange, wherein the final drive gear and the actuation side housing are configured to rotate together about a center axis;
a target ring, wherein the target ring is affixed to the actuation side housing;
a bushing, wherein the bushing and the actuation side housing are coupled by a cylindrical joint; and
an annular position sensor, wherein the bushing and the annular position sensor are affixed, wherein the annular position sensor is configured to detect a relative axial position between the annular position sensor and the target ring, wherein the relative axial position between the annular position sensor and the target ring indicates the electric locking differential is configured in an unlocked configuration or a locked configuration.

2. The electric locking differential of claim 1, wherein the annular position sensor comprises one or more inductive position sensors.

3. The electric locking differential of claim 1, wherein the bushing comprises an axial portion and a radial portion, wherein the radial portion extends radially outwards from the axial portion, wherein the axial portion forms the cylindrical joint with the actuation side housing, wherein the annular position sensor is axially aligned with and disposed radially outwards of the axial portion of the bushing, wherein the annular position sensor is radially aligned with the radial portion of the bushing.

4. The electric locking differential of claim 1, comprising an electromagnet, wherein the actuation side housing is made of a ferrous material, wherein the electromagnet configures the electric locking differential from the unlocked configuration to the locked configuration when the electromagnet is engaged, wherein the bushing, the electromagnet, and the annular position sensor are affixed, wherein the electromagnet, the bushing, and the annular position sensor do not rotate together with the final drive gear and the actuation side housing.

5. The electric locking differential of claim 4, wherein the electromagnet is disposed radially outwards of, axially aligned with, and affixed to the bushing.

6. The electric locking differential of claim 1, comprising a bearing coupled to the actuation side housing, wherein the bearing is coupled to the actuation side housing, wherein the bearing is radially aligned with the bushing, wherein the target ring is axially disposed between the bearing and the annular position sensor.

7. The electric locking differential of claim 1, comprising:
a locking side gear, wherein an axial position of the target ring to the locking side gear is fixed; and
a clutch plate, wherein the clutch plate and the locking side gear form a dog clutch in the locked configuration, wherein an axial position of the clutch plate relative to the annular position sensor is fixed.

8. The electric locking differential of claim 7, comprising:
a bevel gearset, wherein the bevel gearset comprises a plurality of bevel gears, wherein the plurality of bevel gears are affixed to the flange, wherein the final drive gear and the bevel gearset are configured to rotate together about the center axis, wherein the plurality of bevel gears are orthogonal to and rotate about the center axis via orbital motion; and
a side gear, wherein the side gear and the locking side gear are coupled to the plurality of bevel gears, wherein the bevel gearset is disposed axially between the side gear and the locking side gear, wherein the side gear and the locking side gear rotate independently in the unlocked configuration, wherein the side gear and the locking side gear rotate together in the locked configuration.

9. The electric locking differential of claim 8, wherein the flange defines a plurality of recessed portions, wherein the bevel gearset comprises a plurality of pins, wherein the plurality of pins and the plurality of bevel gears are affixed together, wherein the plurality of pins are disposed within and abut the plurality of recessed portions, wherein the plurality of pins and the plurality of bevel gears are orthogonal to and rotate about the center axis via orbital motion.

10. The electric locking differential of claim 7, comprising a return spring, wherein the return spring is configured to return the clutch plate from the locked configuration to the unlocked configuration.

11. The electric locking differential of claim 10, wherein the locking side gear, the return spring, and the clutch plate are radially disposed within and axially aligned with the actuation side housing.

12. The electric locking differential of claim 10, comprising a thrust bearing and a plurality of actuation pins, wherein the plurality of actuation pins rotate together with the actuation side housing, wherein the plurality of actuation pins are axially disposed between, radially aligned with, and couple the thrust bearing and the clutch plate, wherein the thrust bearing is axially disposed between, radially aligned with, and couples the bushing and the plurality of actuation pins.

13. The electric locking differential of claim 12, wherein the thrust bearing couples to a radial portion of the bushing.

14. The electric locking differential of claim 12, wherein the thrust bearing couples axial translation between the bushing and the plurality of actuation pins without coupling rotation of the final drive gear through the actuation side housing and the plurality of actuation pins to the bushing.

15. The electric locking differential of claim 12, wherein the plurality of actuation pins are configured to translate through a radial portion of the actuation side housing.

16. The electric locking differential of claim 10, comprising an inner housing, wherein the inner housing is affixed between the flange and the actuation side housing, wherein the clutch plate and the inner housing are coupled by a spline.

17. The electric locking differential of claim 16, comprising a retaining ring, wherein the return spring is axially disposed between, radially aligned with, and couples the retaining ring and the clutch plate, wherein the retaining ring is affixed to the inner housing.

18. The electric locking differential of claim 16, wherein the flange, the inner housing, and the actuation side housing are affixed by a plurality of fasteners or a weld.

19. A powertrain comprising:
an electric locking differential comprising:
a final drive gear, wherein the final drive gear comprises an external helical gear and a flange, wherein the flange is disposed radially inwards of and axially aligned with the external helical gear;

an actuation side housing, wherein the actuation side housing is affixed to the flange, wherein the final drive gear and the actuation side housing are configured to rotate together about a center axis;

a target ring, wherein the target ring is affixed to the actuation side housing;

a bushing, wherein the bushing and the actuation side housing are coupled by a cylindrical joint; and an annular position sensor, wherein the bushing and the annular position sensor are affixed, wherein the annular position sensor is configured to detect a relative axial position between the annular position sensor and the target ring, wherein the relative axial position between the annular position sensor and the target ring indicates the electric locking differential is configured in an unlocked configuration or a locked configuration;

a motor; and a transmission, wherein the transmission couples torque from the motor to the final drive gear.

20. The powertrain of claim 19, comprising:

a pair of axles, wherein the electric locking differential comprises a side gear and a locking side gear, wherein the pair of axles are coupled to an internal spline of the side gear and the locking side gear; and a pair of driven wheels coupled to the pair of axles, wherein the side gear, the locking side gear, the pair of axles and the pair of driven wheels are configured to rotate about the center axis.

* * * * *